United States Patent [19]
Henderson et al.

[11] 3,950,154
[45] Apr. 13, 1976

[54] REGENERATING DRYING SYSTEM

[76] Inventors: Terry Henderson, 1928 Flintshire Drive, Schaumburg, Ill. 60172; Joseph H. Henderson, 1 S. 712 Vista Ave., Lombard, Ill. 60148

[22] Filed: Mar. 22, 1974

[21] Appl. No.: 453,587

[52] U.S. Cl. ..................................... 55/179; 55/33
[51] Int. Cl.² ......................................... B01D 53/04
[58] Field of Search ............... 55/25, 31, 32, 33, 62, 55/179, 387

[56] References Cited
UNITED STATES PATENTS

| | | | |
|---|---|---|---|
| 3,192,687 | 7/1965 | Silva et al. | 55/62 |
| 3,490,201 | 1/1970 | Colvin et al. | 55/31 |
| 3,568,406 | 3/1971 | Dynes | 55/62 X |
| 3,847,578 | 11/1974 | Munters | 55/390 |

*Primary Examiner*—Charles N. Hart
*Attorney, Agent, or Firm*—Richard C. Lindberg

[57] ABSTRACT

A system for drying air comprises a pair of desiccant containing vessels alternately connected in a drying step, one of the vessels being regenerated while the other is removing moisture from air movable therethrough, with circuit means bypassing air from the air source to one of the vessels for regeneration of same, a heater in the bypass means for heating the air after being bypassed to said vessel and then passing the air to the other vessel, and a cooling circuit in shunt with said circuit means for cooling desiccant in said one vessel and passing cooled air to said other vessel.

4 Claims, 1 Drawing Figure

U.S. Patent   April 13, 1976   3,950,154
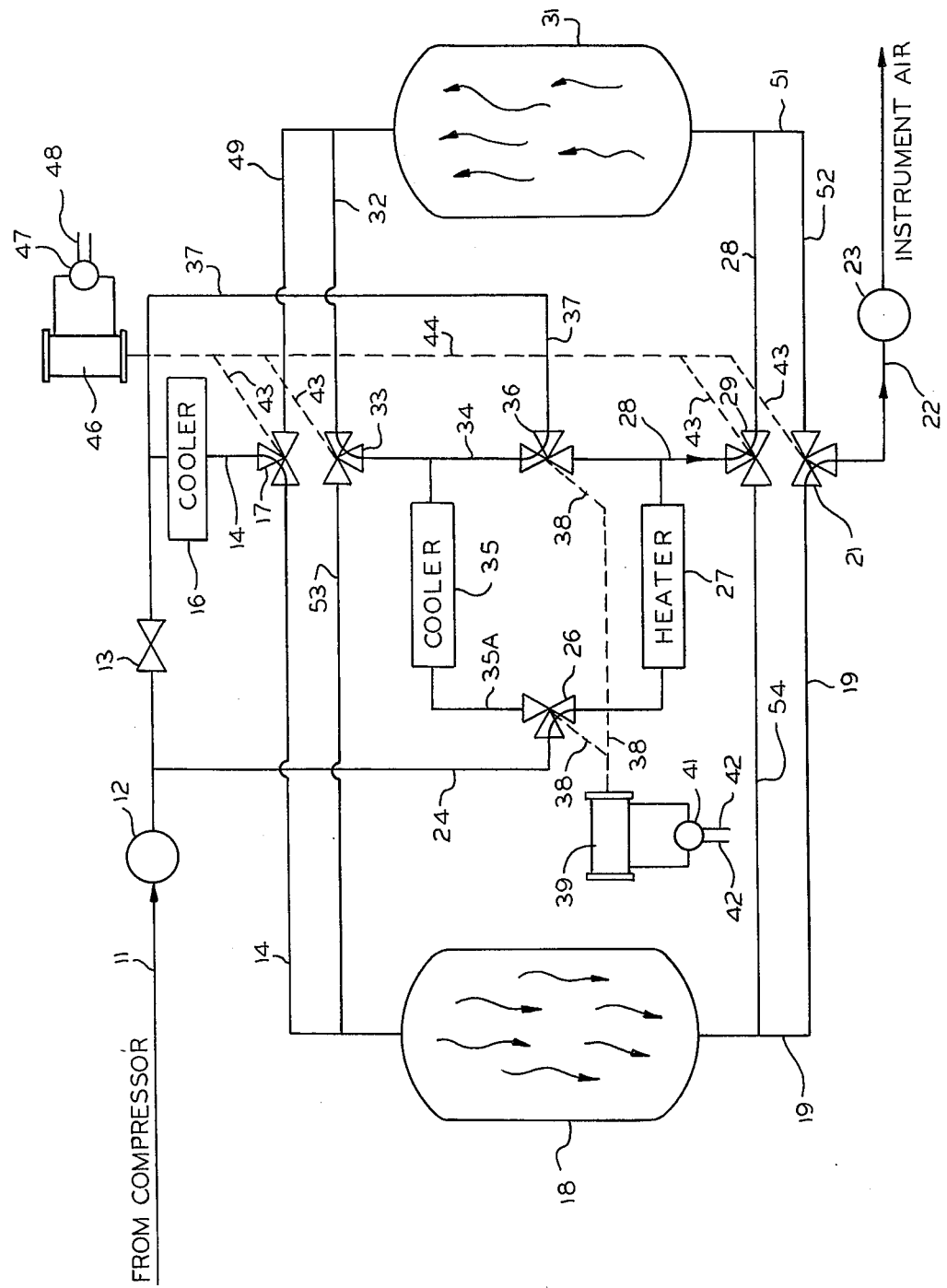

REGENERATING DRYING SYSTEM

BACKGROUND AND SUMMARY OF THE INVENTION

The invention herein relates particularly to systems for drying compressed air employed in many manufacturing processes. The invention being characterized by the employment of heated exhaust heat from a compressor station for regenerating the desiccant in a pair of drying vessels which are alternately connected in an air drying step or in a regeneration step. The invention is characterized by the use of a cooler and a heater connected in a shunt circuit to dry the desiccant in the regenerating step and to cool the desiccant to make it more efficient for use when it is employed in the drying cycle.

THE DRAWING

The single FIGURE shows a drying system having the improvements according to the present invention embodied therein.

The improved regenerating drying system according to the present invention is adapted to be connected in a line 11 from a compressor source, line 11 being connected to a prefilter 12 which separates oil mist from the compressed air. A flow regulating valve 13 is connected in line 11 and a line 14 branching from line 12 has a cooler 16 connected therein. A three way valve 17 in line 14 is interposed between cooler 12 and a vessel 18 containing desiccant material past which the cooled air from cooler 16 must move in drying same. Valve 17 is connected at this time to pass air to vessel 18.

The dried air exits from vessel 18 via a line 19 past a three-way valve 21 to a line 22 and past an afterfilter 23 to supply "instrument air."

Vessel 18 is adapted to dry air supplied thereto while a second vessel 31 has the desiccant therein regenerated, the two vessels 18 and 31 being alternately connected in a drying step and a regeneration step, as will be described.

Structure is provided for connecting the vessels 18 and 31 alternately for drying and regeneration and includes a bypass circuit connected between the air source and the connection of the source to the vessel in the drying step to bypass a portion of the supplied air to the vessel having the desiccant therein being regenerated.

Such bypass circuit includes a line 24 connected through a three-way valve 26 to a heater 27 connected in turn to the line 28 connected to vessel 31, a three-way valve 29 being interposed in line 28 between heater 27 and vessel 31.

Energy for heater 27 is preferably supplied by waste heat from a compressor (not shown) supplying compressed air to line 11.

An additional circuit for connecting vessel 31, which has been partly regenerated by heated air moving through the desiccant therein, with vessel 18 (now in the drying step) includes a line 32 connected to vessel 31 and through a three-way valve 33 connected by a line 34 in turn connected through a three-way valve 36 to a line 37 connected back to line 11 and cooler 16.

The heated air from regenerating desiccant in vessel 31 is thus cooled at cooler 16, and is further dried in vessel 18.

It may be noted that the bypass circuit described bypasses approximately 20% of the air supplied at line 11 for regeneration of the desiccant in vessel 31.

However, it is desirable for maximum efficiency to have the desiccant in vessel 31 at the coolest practicable temperature for its drying step, and to this end a cooling circuit is connected in shunt with the bypass circuit described. Such cooling circuit includes a line 35A connected to three-way valve 26, and cooler 35 connected between three-way valve 33, and through the latter, the cooled air moving in reverse direction via line 32 through vessel 31.

The cooling circuit is completed through vessel 31 by line 28 and three-way valve 29 therein and past valve 36 and line 37 to source 11.

The regenerating cycle for vessel 31 including the bypass circuit and shunt cooling circuit is controlled by actuators 38 for three-way valves 26 and 36, the actuators being shiftable by an air cylinder 39 controlled by a suitable control device 41 connected in a circuit 42.

When the cooling circuit is in effect valve 26 is shifted to bypass air to cooler 35, and valve 36 is shifted to pass cooled air from vessel 31 to line 37.

After a certain interval of use the desiccant within vessel 18 is ready for regeneration and now-regenerated vessel 31 is ready to be placed on a drying cycle. At this time three-way valves 17, 21, 29 and 33 are shifted to a second position, so as to place vessel 18 on line for regeneration of the desiccant therein, and vessel 31 on line for drying.

Valves 17, 21, 29 and 33 are actuated to a switched position by actuators 43 at each valve, these being gang actuated by a member 44 part of a cylinder 46. The cylinder 46 is controlled in its operation by a control device, such as a timer 47 or a suitable sensor connected to a supply 48 of actuating air.

It should be understood that valves 17, 21, 29 and 33 are shown schematically as are also actuators 43, and it is within the scope of the invention to have individual actuators at each such valve.

When the aforesaid valves are shifted to the switched position, air at line 11 is moved past valve 17 to a line 49 to enter vessel 31 to course through the regenerated desiccant therein, the dried air leaving vessel 31 via lines 51 and 52 to exit as instrument air via valve 43 and line 22.

At the same time a bypass circuit for reenergizing desiccant in vessel 18 is provided, the bypass circuit being via line 24, through valve 26, heater 27, line 28, valve 29, a line 54, vessel 18, a line 53, line 34, valve 36 and thence line 37 to the source 11, as with the previous condition described.

It should be noted that the actuating cylinder 39 at this time has reverted back to the condition seen in the drawing by a suitable sensing device such as a humidistat at the vessel 31.

As with vessel 31, after the desiccant within vessel 18 has been suitably dried by the heated air within the bypass circuit, the desiccant within vessel 18 is cooled preparatory to a resumption of a drying process. At such time cylinder 39 is actuated and the cooling circuit through the cooler 35 is recommenced.

At this time flow of air through vessel 18 is reversed and cooled air enters same via valve 33, line 53, exiting via line 54, and moving past valve 29, line 28, valve 36 and line 37 to the source at line 11.

Such cooled air also moves past cooler 16 as in the other condition where vessel 18 is being regenerated.

The provision of circuitry for cooling the regenerated desiccant after removal of moisture therefrom by the heated air provides a desiccant at a temperature for efficient moisture removal. Also the use of heaters energized by waste heat for compressors makes for very efficient operation.

We claim:

1. In a system for drying air:
   a. a source of air to be dried;
   b. a pair of vessels containing desiccant material past which air must move in the drying of same;
   c. said vessels being alternately connected in a drying step between said source and a discharge point for dried air;
   d. one of said vessels having the desiccant material therein being regenerated while the desiccant material of the other of said vessels is removing moisture from air supplied at said source;
      A. said vessels being arranged so that the flow of air through the other vessel connected for removing moisture therefrom is in one direction, while
      B. said one vessel having the desiccant material therein being regenerated having the flow of regenerating air in the opposite direction from the flow of air in the other vessel;
   e. circuit means for connecting said vessels alternately for drying and regeneration by flow therethrough in said opposite directions comprising;
   f. a bypass circuit connected between said source and the connection of said source to the vessel in said drying step and bypassing a part of the air from said source;
   g. a heater in said bypass circuit for heating said bypass air before being diverted to said one vessel;
   h. additional circuit means for connecting said one vessel to the other vessel with heated bypass air which has regenerated the desiccant therein;
   i. a cooling circuit connected in shunt with said by pass circuit and having a cooler connected therein including means for directing cooler air in an opposite direction through the desiccant of said one vessel to cool the desiccant therein after the desiccant has been regenerated.

2. In a system according to claim 1 wherein means are provided for shifting said bypass circuit for cooling and heating of the desiccant in said first vessel.

3. The invention according to claim 2 wherein said bypass circuit and said cooling circuit are controlled by valve means.

4. The invention according to claim 1 wherein said vessels are alternated between drying and regeneration by valve means.

* * * * *